United States Patent [19]

Shimizu

[11] Patent Number: 5,034,640
[45] Date of Patent: Jul. 23, 1991

[54] END FRAME OF A SMALL MOTOR WITH MULTIPLE OPENINGS FOR MULTIPLE TERMINAL LOCATIONS

[75] Inventor: Masaaki Shimizu, Kosai, Japan

[73] Assignee: Asmo Co., Ltd., Kosai, Japan

[21] Appl. No.: 629,000

[22] Filed: Dec. 18, 1990

Related U.S. Application Data

[63] Continuation of Ser. No. 379,377, Jul. 13, 1989, abandoned.

[30] Foreign Application Priority Data

Jul. 15, 1988 [JP] Japan .............................. 63-94241[U]

[51] Int. Cl.$^5$ ...................... H02K 11/00; H02K 5/04; H02K 5/14; H01R 39/36
[52] U.S. Cl. ......................................... 310/71; 310/89; 310/49 MM; 310/238; 310/246
[58] Field of Search ............. 310/40 MM, 71, 89, 238, 310/239, 244, 246, 249; 439/217, 218, 219, 220, 221, 222, 223, 224

[56] References Cited

U.S. PATENT DOCUMENTS

| | | | |
|---|---|---|---|
| 3,539,855 | 11/1970 | Blume | 310/239 |
| 3,636,393 | 1/1972 | Pieper | 310/71 |
| 4,746,829 | 5/1988 | Strobl | 310/244 |
| 4,774,430 | 9/1988 | Rodriquez et al. | 310/71 |

FOREIGN PATENT DOCUMENTS 0035806  3/1977  Japan ................................ 310/246

Primary Examiner—Steven L. Stephan
Assistant Examiner—C. La Balle
Attorney, Agent, or Firm—Burns, Doane, Swecker & Mathis

[57] ABSTRACT

An end frame of a small motor comprises an outer frame constructed of a yoke and the end frame which is fixed at an end of the yoke and has various directions and/or positions for extraction of terminals to be fixedly provided in the end frame, the end frame (1) of the small motor being characterized in that inserting holes (3~10) for forcedly fixing the terminals (2) serving as brush holders, (14a) are made previously in the end frame (20) in multiple positions and/or directions based on multiple usages of the small motor.

6 Claims, 6 Drawing Sheets

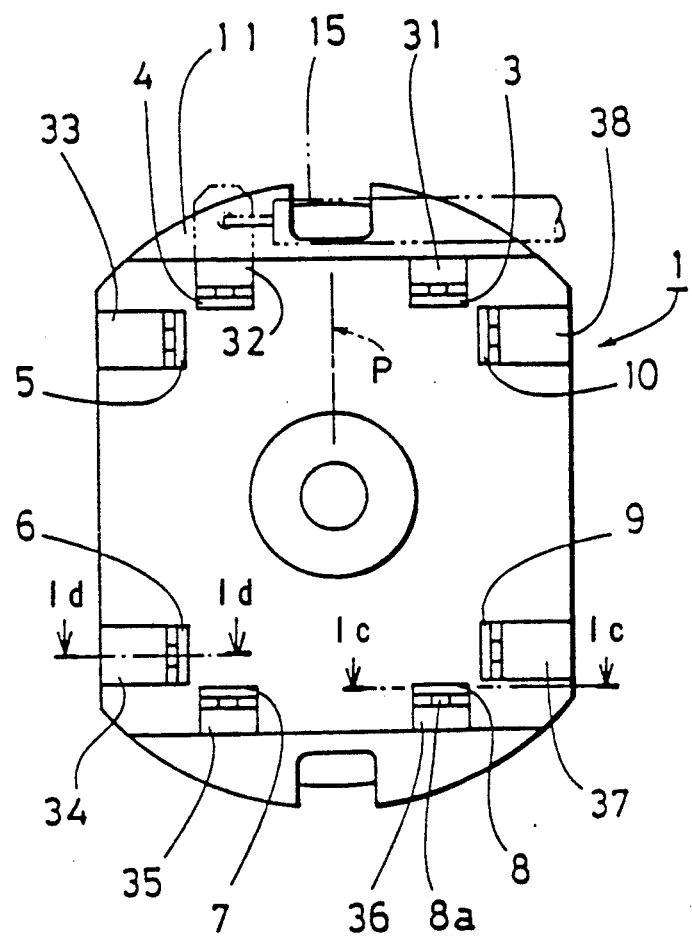
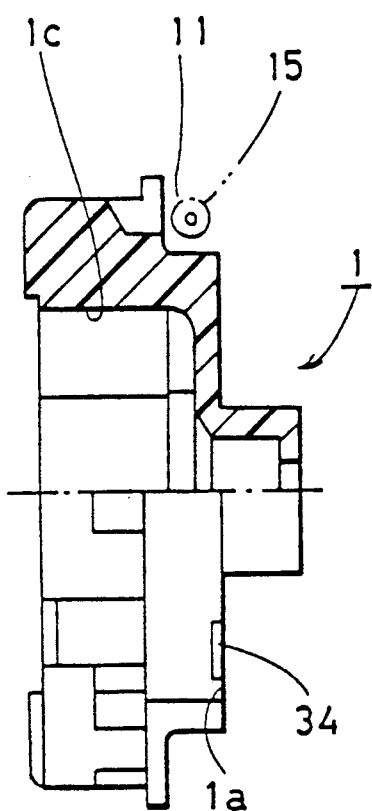
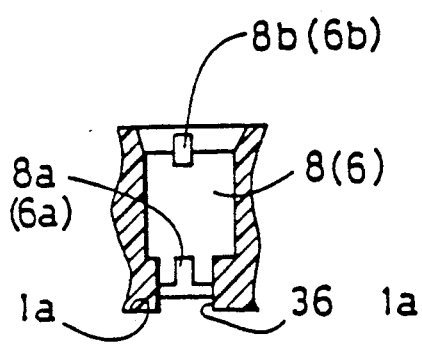
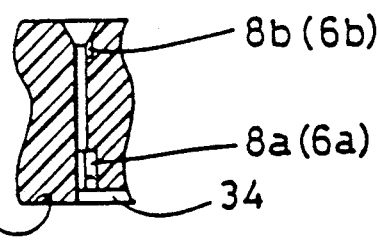
FIG. 1(a)
FIG. 1(b)
FIG. 1(c)
FIG. 1(d)

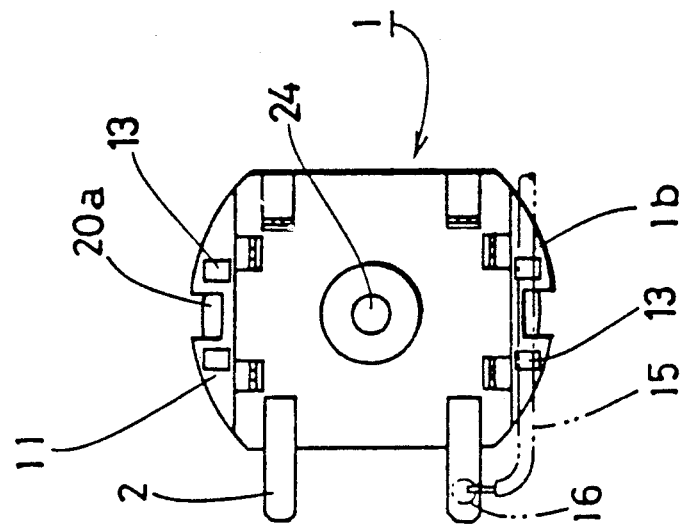
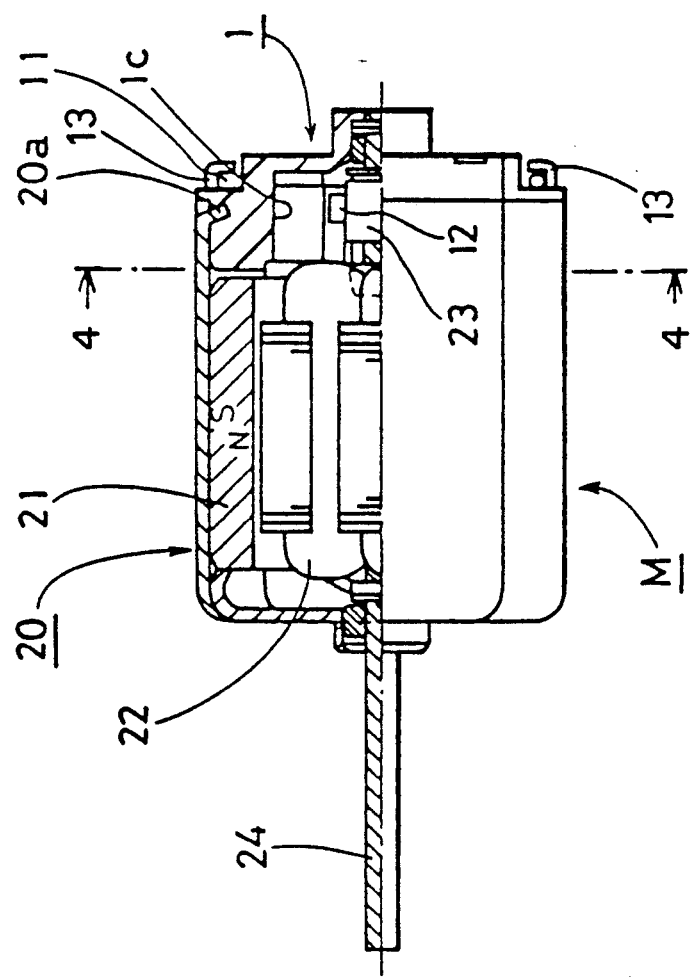

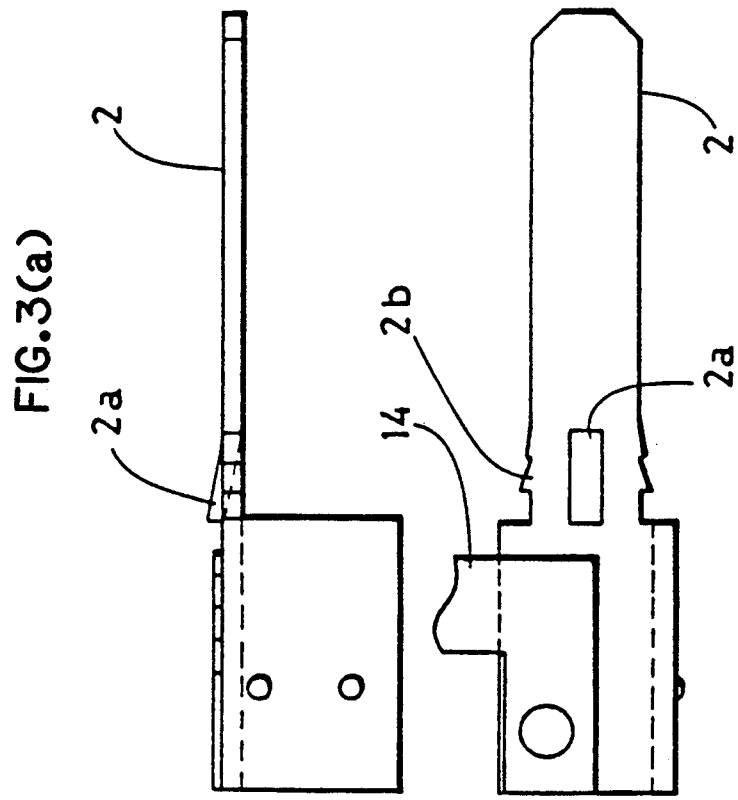
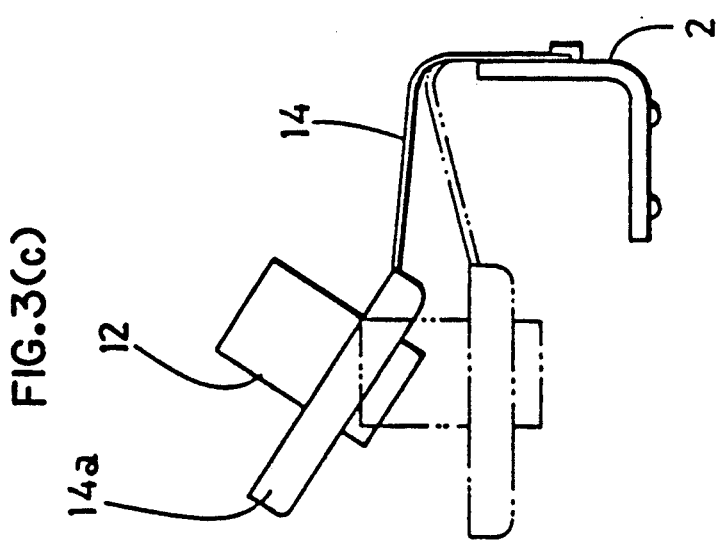

END FRAME OF A SMALL MOTOR WITH MULTIPLE OPENINGS FOR MULTIPLE TERMINAL LOCATIONS

This application is a continuation of application Ser. No. 07/379,377, filed July 13, 1990 now abandoned.

BACKGROUND OF THE INVENTION

The present invention relates to an end frame of a small motor being a driving source of an actuator for various apparatuses installed in a vehicle or the like.

Conventional small motors for vehicle or the like have common output characters. Consequently, though the small motors have common external shape measures, directions and/or positions for extraction of terminals from an end frame of the small motor are required to be changed to vary according to type of an actuator, because there are requirements in size of the motor-assembled actuator, such as an electric-driving mirror actuator and a door-locking actuator and further requirements in connection structure between the terminals serving as brush holders and a wire harness of the small motor. As a result thereof, the conventional small motor is provided with many types of the end frames having various directions and/or positions for extraction of the terminals, which causes wrong assembly of the motor due to presence of many parts, difficulty in automatic assembly of the motor and no reduction of motor price.

SUMMARY OF THE INVENTION

It is an object of the present invention to provide an end frame of a small motor which enables easy automatic assembly of the small motor.

It is another object of the present invention to provide an end frame of a small motor which enables extraction of terminals in various directions and/or positions to meet requirements of an actuator.

It is a further object of the present invention to provide an end frame of a small motor which can meet the limitation in size by preventing relief of the terminals from an end face of the end frame.

It is another further object of the present invention to provide an end frame of a small motor wherein leads attached to the terminals do not spread from the end frame, so that they do not interrupt actuation of various actuators, other parts and wiring.

An object of the present invention is to provide an end frame of a small motor for receiving the limitations. It is provided by the invention, in a small motor comprising an outer frame constructed of a yoke and an end frame which is fixed at an end of the yoke and has various directions and/or positions for extractions of terminals to be fixedly provided in the end frame, said end frame of the small motor is characterized in that inserting holes for forcedly fixing the terminals serving as brush holders are made previously in the end frame in multiple positions and/or directions based on multiple usages of the small motor.

According to the above construction, the small motors can be desirably manufactured to have various directions and/or positions for extractions of terminals just by change of directions and/or positions for forcedly fixing the terminals relative to the inserting holes of the end frame if the terminals are extracted in various directions and/or positions in the small motors having common external shape measures because of requirements in various actuators. As illustrated in FIG. 6, conventional small motors are broadly classified into two types according to directions and positions for extraction of plate-shaped terminals in relation to a longitudinal direction of the end frame of the small motors with substantial-oval sections; a lateral type motor in which the terminals are extracted laterally from the end frame 1, a vertical type motor in which the terminals are extracted vertically from the end frame 1. According to pattern for extraction of the terminals 2, the small motors of the lateral type and the vertical type are further classified into the two types; a normal type motor in which the terminals 2 are extracted perpendicularly to an end face of the end frame, a bending type motor in which the terminals 2 are bent parallel relative to the end face of the end frame 1. In the present invention, certain stereotyped forms are found about directions and/or positions for extraction of the terminals from the end frame and the inserting holes are made previously relative to the end flame in the multiple positions and/or directions based on the above form.

The end frame of the present invention is also characterized in that bending grooves are cut successive to outlets of the inserting holes made at an end face of the end frame to prepare for the case that the terminals are bent in parallel with the end face of the end frame.

According to the above construction, the terminals can be received in the beginning grooves not to relieve from the end face of the end frame by bending of the terminals along the bending grooves relative to the end face of the end frame.

The end frame of the present invention is further characterized in that lead guiding grooves which can insert leads attached to the terminals are cut at a side end of the end frame. According to the above construction, the leads can be completely received by being inserted into the lead guiding grooves, so that the leads may be prevented from interrupting operation of an actuator.

Other and further objects, features and advantages of the invention will become appear more fully from the following description.

BRIEF DESCRIPTION OF THE DRAWINGS

FIG. 1(a), FIG. 1(b), FIG. 1(c) and FIG. 1(d) illustrate end frames of the embodiment of the present invention.

FIG. 1(a) is a front view.

FIG. 1(b) is a semi-sectional view.

FIG. 1(c) and FIG. 1(d) are sectional views take on lines C—C and D—D of FIG. 1(a).

FIG. 2(a) and FIG. 2(b) are a semi-sectional view and a side view of a small motor wherein an end frame of the present embodiment is attached.

FIG. 3(a), FIG. 3(b) and FIG. 3(c) are a bottom view, a front view and a side view showing the terminal.

DETAILED DESCRIPTION OF THE PREFERRED EMBODIMENTS

Referring now to FIGS. 1 to 4, there is shown an embodiment of an end frame of the present invention.

Figure 6:
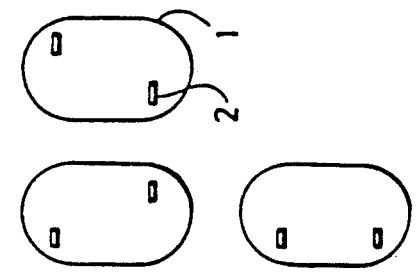
FIG. 6 is a chart for explanation of operation of the invention.

As illustrated in FIG. 1(a) and FIG. 1(b), eight substantial-rectangular inserting holes 3 to 10 are made in a non-conductive end frame 1 with a substantial-oval shape manufactured from resin so as to be adaptable to various actuators along the axial direction of the end frame 1. As illustrated in FIG. 6, the inserting holes 5, 6, 9, and 10 are elongated parallel to a longitudinal direction P of the substantial-oval end frame 1, meanwhile the inserting holes 3, 4, 7 and 8 are elongated perpendicularly to the longitudinal direction of the substantial-oval end frame 1. As can be seen in FIG. 1a, two openings are located at each of the four corners of the end frame.

FIG. 1(c) and FIG. 1(d) are cross-sectional views taken on lines C—C and D—D of FIG. 1(a). At outlets of the inserting holes 8 and 6, grooves 8a and 6a are cut so that the terminals 2 as illustrated in FIG. 3(a) to FIG. 3(c) can be easily inserted into the inserting holes 8 and 6 by the grooves 8a and 6a. At roots of the inserting holes 8 and 6, cave portions 8b and 6b are cut to be adapted to fit a rise 2a rising from a root of the terminal 2 in the cave portions 8b and 6b. The structure of the inserting holes 3 to 5 and, 7, 9 and 10 is the same as that of said inserting holes 8 and 6. A cave 1c is formed inside the end frame 1.

As illustrated in FIG. 2(a), a small motor M of the present invention is made up of the end frame 1 and a yoke 20 which together define an outermost frame structure of the motor as is evident from FIG. 2(a). The end frame 1 and the yoke 20 are incorporated by caulking a rise 20a of the yoke 20 at a bottom of a lead guiding groove 11 cut at a side end 1b in a longitudinal direction of the end frame 1. A field magnet 21 is fixed within the yoke 20 and receives an armature 22 centrally therethrough. The armature 22 is rotatably supported on an axis by the yoke 20 and the end frame 1 through a motor output shaft 24. A brush 12 is resiliently contacted with a commutator 23 of the armature 22 at the cave 1c of the end frame 1.

As illustrated in FIG. 3(a) to FIG. 3(c), the brush 12 is fixedly connected to an end of the terminal 2 through a brush spring 14 formed by bending a brush holding portion 14a. As illustrated with a solid line in FIG. 3(c), an end face of the brush 12 is urged normally to incline due to elastic force of the brush spring 14. When the brush 12 contacts with the commutator 23, the brush spring 14 bends resiliently as illustrated with a two-point chain line in FIG. 3(c), which causes the end face of the brush 12 to contact with a surface of the commutator 23. A saw-toothed stop 2b is formed at a root of the terminals 2, so that the terminals 2 can be fixed in the inserting holes 3 to 10 not to slide off from the inserting holes 3 to 10 after being forcedly fixed in the inserting holes 3 to 10.

Figure 4A:
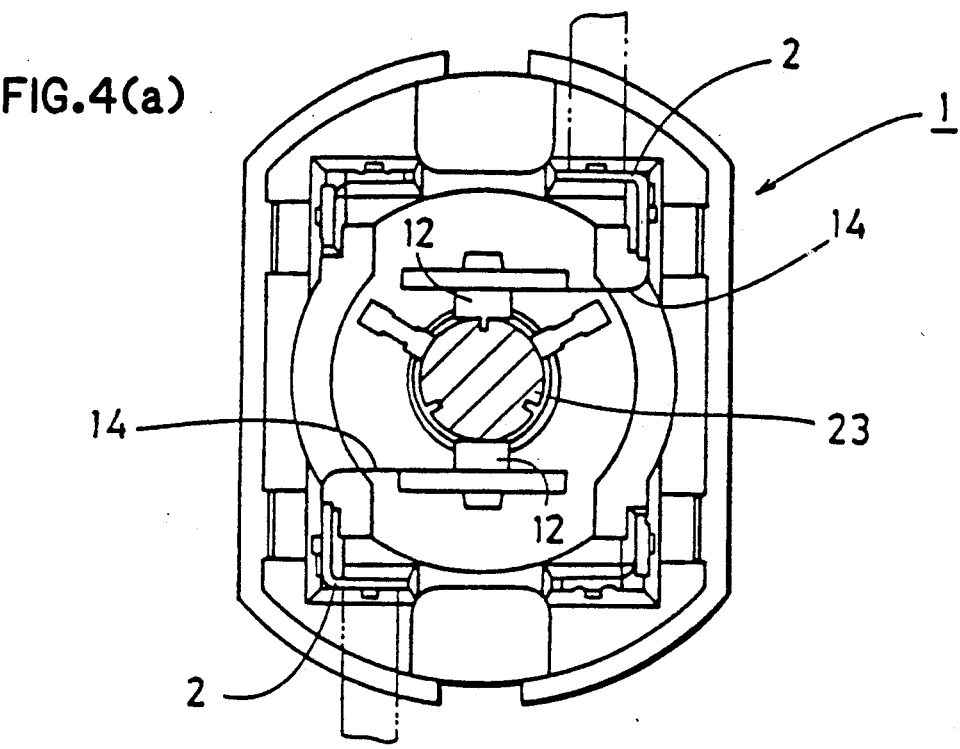
FIG. 4(a) and FIG. 4(b) are cross-sectional views taken on line IV—IV of FIG. 2(a).
Figure 4B:
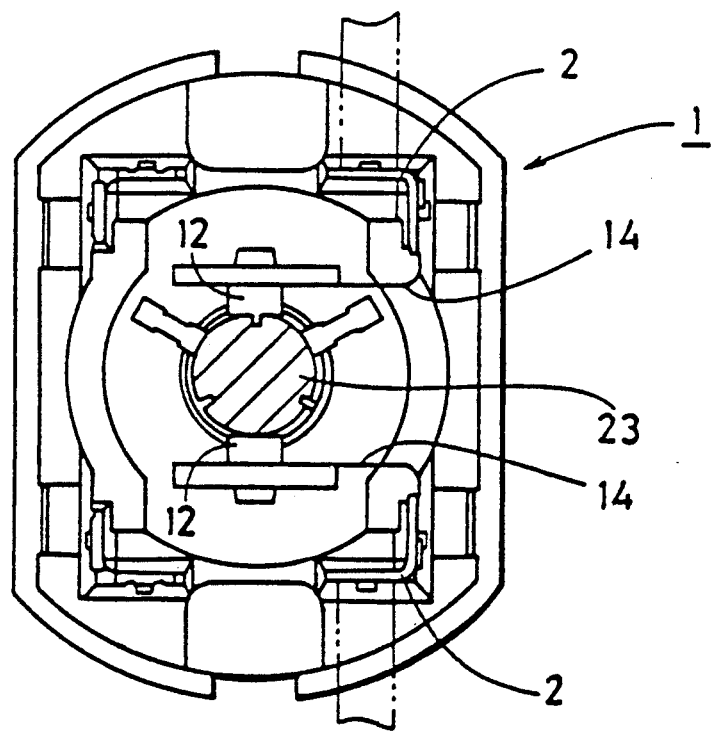

FIG. 4(a) and FIG. 4(b) illustrate instances when the brush 12 of the terminal 2 is contacted with the commutator 23. In illustration of FIG. 4(a), the two terminals 2 are forcedly fixed diagonally opposite and horizontally relative to the end frame 1 and the brushes 12 are fixed in the brush springs 14 extending in two different directions. In illustration of FIG. 4(b), the two terminals 2 are forcedly fixed on the same side and horizontally relative to a center line of the end frame 1 and the brushes 12 are fixed in the brush springs 14 extending in the same direction. There is also an instance when the terminals 2 are forcedly fixed vertically relative to the end frame 1 (not illustrated).

As illustrated in FIG. 1(a) to FIG. 1(d), eight bending grooves 31 to 38 are so made as to be able to receive the terminals 2 successive to the outlets of the inserting holes 3 to 10 at the end face 1a of the end frame 1, so that the terminals 2 are adapted not to relieve from the end face 1a in case of bending the terminals 2 to be forcedly fixed in the bending grooves 3 to 10.

As illustrated in FIG. 1(a) and FIG. 1(b) and FIG. 2(a) and FIG. 2(b), in the present embodiment, an outer face of the end frame 1 has a lead guiding groove 11 with a depth which can insert the lead 15 attached to the terminals 2 to be forcedly fixed in the inserting holes 3 to 10 is made at the side end of the longitudinal direction of the end frame 1. Thereby, the lead 15 is adapted not to relieve from the end frame 1 and the yoke 20 of the motor M by insertion of the lead into the lead guiding groove 11 after the lead 15 is attached to the terminals 2 to be forcedly fixed in the inserting holes 3 to 10 by a soldering 16 or the like. The lead 15 can be held more securely by locating a hook-shaped lead fixing claws 13 in the lead guiding groove 11 of the end frame 1, wherein the fixing claw 13 is incorporatedly provided.

Figure 5A:
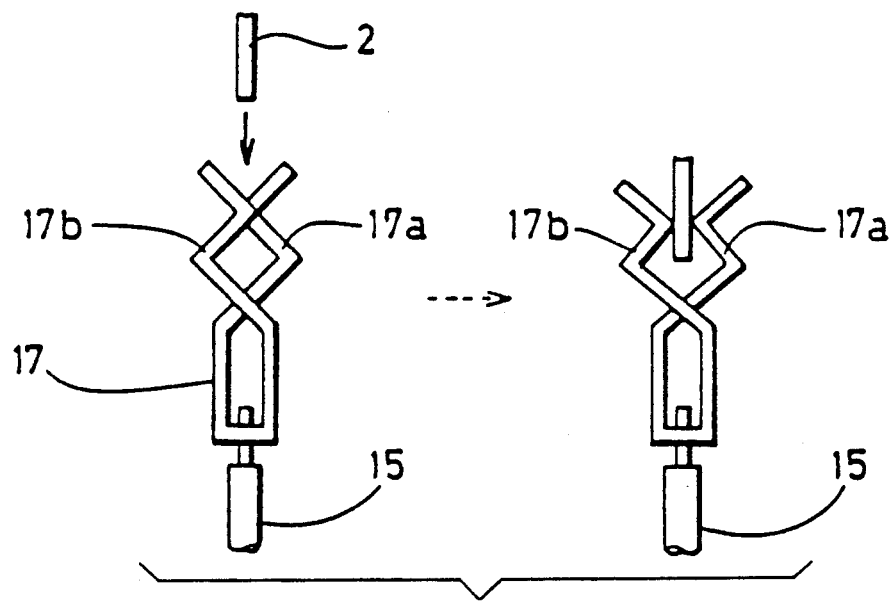
FIG. 5(a) and FIG. 5(b) are a front view and a perspective view illustrating an example of a construction that the lead is attached to the terminal.
Figure 5B:
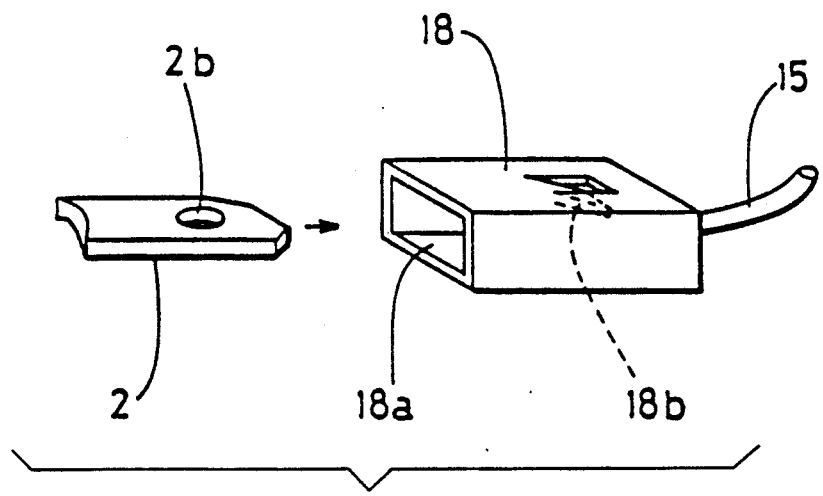

There are methods for attaching the lead 15 to the terminals 2 as illustrated in FIG. 5(a) and FIG. 5(b), besides the soldering 16. FIG. 5(a) illustrates the method that a tulip-shaped connector with elastic conductive plates 17a and 17b openable in the right and the left is connected to an end of the lead 15 and the elastic conductive plates 17a and 17b are opened by insertion of the terminal 2 into the connector 17, so that the lead 15 can be attached to the terminal 2. FIG. 5(b) illustrates the method that a cuboid connector 18 having a rectangular inserting inlet 18a (section not illustrated) and the rise 18b rising from an upper wall is connected to an end of the lead 15 and the rise 18b is engaged with the stop 2b of the terminal 2 by insertion of the terminal 2 into the inserting inlet 18a of the cuboid connector 18, so that the lead 15 can be attached to the terminal 2.

OPERATION

According to the present embodiment of the above construction, if the terminals 2 are required to be fixed relative to the end frame 1 in a lateral-pattern structure as classified in FIG. 6, the terminals 2 are inserted through the two of the lateral inserting holes 3, 4, 7 and 8 as illustrated in FIG. 1(a) to be forcedly fixed in the end frame 1. If a normal type of the lateral-pattern structure is required, the terminals 2 remain forcedly fixed in the two of the lateral inserting holes 3, 4, 7 and 8 of the end frame 1. Meanwhile, if a bending type is required, the terminals inserted into the inserting holes 3, 4, 7 and 8 are bent to be received in the bending grooves 31, 32, 35 and 36.

If there is a need of a structure classified as a vertical pattern in FIG. 6, vertical inserting holes 5, 6, 9 and 10 illustrated in FIG. 1(a) are used. If a bending type of the vertical structure is required, the bending grooves 33, 34, 37 and 38 provided in the outer face of the end frame successive to the vertical holes 33, 34, 37, 38 can be used to meet the requirements in the same manner with the bending type of the lateral pattern.

Consequently, the construction of the present embodiment has the advantage in that it can provide a small motor having a simple structure which is replaced for twenty-type structure as exampled in FIG. 6.

According to the present invention, the terminals can be extracted in various directions and/or positions from the inserting holes of the end frame of the motors having common external shape measures according to multiple usages of the motor. Thus, the present invention has an advantage in that the presence of many end frames can be prevented because there is no need of many kinds of end frames and automatic assembly of the motor can be carried out easily using a machine tool suitable to all the inserting holes.

Also, there is an instance when the end frame of the present invention so constructed that bending grooves are cut successive to outlets of the inserting holes provided at an end face of the end frame to prepare for the case that the terminals are bent in parallel with the end face of the end frame. In this instance the limitation in size can be met because the bent terminals can be received in the bending grooves not to relieve from the end face of the end frame.

Further, there is an instance when the end frame of the present invention is so constructed that lead guiding grooves which can insert leads attached to the terminals are cut at a side end of the end frame. In this instance the leads can be completely inserted into the lead guiding grooves, not to interrupt actuation of various actuators, other parts and wiring.

The present invention in not intended to be limited to details of the construction of the above embodiment, therefore for example, there is an instance when the terminal 2 is bent inside the end frame 1 if electricity is supplied to the small motor M from a dry cell. Also, there is an instance when the terminal 2 is formed to have both a plate-shaped section (illustrated) and a hook-shaped section formed by bending a plate at a right angle. Further, positions for making of the inserting holes in the end frame 1 are not limited by only the embodiment as illustrated above. Therefore, the inserting holes may be made previously in multiple positions and directions to be used selectively in the necessary number.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A small motor comprising a yoke, an end frame element connected to said yoke, said yoke and end frame element together defining an outermost frame structure of said motor, an armature rotatably supported within an interior defined by said outermost frame structure, said end frame being of oval-shape in section and connected to a substantially identically oval-shaped end of said yoke, said oval shape defining a longitudinal direction, said end frame element having four corner regions and first and second openings disposed at each of said corner regions, each of said first and second openings opening into said interior, each of said first openings being elongated parallel to said longitudinal direction, and each of said second openings being elongated perpendicularly to said longitudinal direction, terminal leads being provided in said end frame element, a set of two terminals fixedly connected within two of said openings, each terminal including an outer terminal portion and an inner brush spring, said brush spring carrying a brush which contacts a commutator portion of said armature, and two terminal leads being provided in said end frame element and connected to respective ones of said two terminal portions.

2. A small motor according to claim 1, wherein said end frame element has an outer face including a plurality of terminal-receiving grooves leading from respective ones of said openings, each of said grooves being sized to receive said terminal portion which has been bent laterally relative to its respective opening.

3. A small motor according to claim 1, wherein said end frame element has an outer face including a pair of lead-receiving grooves for receiving respective ones of said leads, said lead-receiving grooves being situated at opposite sides of said end frame element.

4. A small motor according to claim 3, wherein said outer face of said end frame element includes hook-shaped claws disposed adjacent said lead-receiving grooves for holding said leads within said lead-receiving grooves.

5. A small motor according to claim 1, wherein said end frame element is plate-shaped and connected to an end of said yoke.

6. A small motor according to claim 1, wherein said openings are formed to have hook-shaped sections for holding hook-shaped terminals.

* * * * *